US012790480B2

(12) United States Patent
Kim et al.

(10) Patent No.: US 12,790,480 B2
(45) Date of Patent: Nov. 10, 2026

(54) POLYOXYMETHYLENE POLYMER COMPOSITION THAT IS MEDIA RESISTANT

(71) Applicant: Celanese International Corporation, Irving, TX (US)

(72) Inventors: Sung Hye Kim, Cincinnati, OH (US); Lowell Jay Larson, Independence, KY (US)

(73) Assignee: Celanese International Corporation, Irving, TX (US)

( * ) Notice: Subject to any disclaimer, the term of this patent is extended or adjusted under 35 U.S.C. 154(b) by 73 days.

(21) Appl. No.: 17/672,457

(22) Filed: Feb. 15, 2022

(65) Prior Publication Data

US 2022/0259422 A1 Aug. 18, 2022

Related U.S. Application Data

(60) Provisional application No. 63/149,915, filed on Feb. 16, 2021.

(51) Int. Cl.
*C08L 59/02* (2006.01)

(52) U.S. Cl.
CPC ........... *C08L 59/02* (2013.01); *C08L 2201/08* (2013.01)

(58) Field of Classification Search
CPC ... C08L 59/02; C08L 59/04; C08K 2003/222; C08K 2003/2224; C08K 5/13; C08K 5/20; C08K 5/098; C08K 2201/014
See application file for complete search history.

(56) References Cited

U.S. PATENT DOCUMENTS

| | | | |
|---|---|---|---|
| 3,642,942 | A | 2/1972 | Castner et al. |
| 4,675,356 | A | 6/1987 | Miyata |
| 5,157,073 | A | 10/1992 | Kunz |
| 6,211,268 | B1 | 4/2001 | Matsummura et al. |
| 6,489,388 | B1 | 12/2002 | Kurz et al. |
| 6,943,214 | B2 | 9/2005 | Flexman |
| 7,183,340 | B2 | 2/2007 | Harashina et al. |
| 7,247,665 | B1 | 7/2007 | Woerner et al. |
| 7,261,989 | B2 | 8/2007 | Sugiura et al. |
| 7,893,140 | B2 | 2/2011 | Hase |
| 8,383,712 | B2 | 2/2013 | David et al. |

(Continued)

FOREIGN PATENT DOCUMENTS

| | | | |
|---|---|---|---|
| CN | 1569957 | A | 1/2005 |
| CN | 1730545 | A | 2/2006 |

(Continued)

OTHER PUBLICATIONS

CN106947212 A English Translation (Year: 2017).*

(Continued)

*Primary Examiner* — Catherine S Branch
*Assistant Examiner* — Huihong Qiao
(74) *Attorney, Agent, or Firm* — Dority & Manning, P.A

(57) ABSTRACT

Polyoxymethylene polymer compositions and molded articles made from the composition are disclosed that are fuel resistant, particularly diesel fuel resistant, and resistant to highly acidic solutions. The polymer composition contains a polyoxymethylene polymer generally in an amount from about 90% to about 95% by weight. In addition, the polymer composition contains an acid neutralizing agent and a plasticizer.

20 Claims, 2 Drawing Sheets

(56) References Cited

U.S. PATENT DOCUMENTS

| | | | | |
|---|---|---|---|---|
| 9,561,328 | B2 | 2/2017 | Shang et al. | |
| 9,920,183 | B2 | 3/2018 | Shimoda et al. | |
| 10,072,147 | B2 | 9/2018 | Shimoda et al. | |
| 10,323,136 | B2 * | 6/2019 | Pfaendner | C08K 5/3475 |
| 10,844,191 | B2 | 11/2020 | Arai et al. | |
| 11,485,856 | B2 | 11/2022 | Kim et al. | |
| 2003/0125512 | A1 | 7/2003 | Nakamura et al. | |
| 2004/0176508 | A1 | 9/2004 | Notorgiacomo | |
| 2004/0230001 | A1 | 11/2004 | Flexman | |
| 2004/0242747 | A1 | 12/2004 | Nandi | |
| 2005/0020770 | A1 | 1/2005 | Kim et al. | |
| 2005/0176835 | A1 | 8/2005 | Kobayashi et al. | |
| 2007/0235693 | A1 | 10/2007 | Price et al. | |
| 2007/0276070 | A1 | 11/2007 | Kim et al. | |
| 2008/0271381 | A1 * | 11/2008 | Harashina | C09F 1/02 51/298 |
| 2010/0093901 | A1 | 4/2010 | Kawaguchi et al. | |
| 2011/0313086 | A1 | 12/2011 | Sharavanan et al. | |
| 2013/0284290 | A1 | 10/2013 | Basista et al. | |
| 2014/0137975 | A1 | 5/2014 | Klug et al. | |
| 2014/0166940 | A1 * | 6/2014 | Klug | H01B 1/22 |
| 2014/0179841 | A1 | 6/2014 | Bihari et al. | |
| 2014/0186562 | A1 | 7/2014 | Klug et al. | |
| 2015/0175798 | A1 | 6/2015 | Klug | |
| 2015/0291722 | A1 | 10/2015 | Wang et al. | |
| 2016/0223269 | A1 | 8/2016 | Hartmann et al. | |
| 2016/0237221 | A1 | 8/2016 | Monma et al. | |
| 2016/0251509 | A1 | 9/2016 | Shimoda et al. | |
| 2018/0079893 | A1 | 3/2018 | Lin et al. | |
| 2018/0319980 | A1 * | 11/2018 | Kim | C08L 71/02 |
| 2020/0172699 | A1 * | 6/2020 | Arai | C08K 3/22 |
| 2023/0374288 | A1 * | 11/2023 | Kanda | C08L 59/00 |

FOREIGN PATENT DOCUMENTS

| | | | | |
|---|---|---|---|---|
| CN | 1891753 | A | 1/2007 | |
| CN | 101619155 | A | 1/2010 | |
| CN | 102993624 | A | 3/2013 | |
| CN | 103059501 | A | 4/2013 | |
| CN | 103087460 | A | 5/2013 | |
| CN | 103304955 | A | 9/2013 | |
| CN | 103804847 | A | 5/2014 | |
| CN | 103903608 | A | 7/2014 | |
| CN | 104341709 | A | 2/2015 | |
| CN | 104419111 | A | 3/2015 | |
| CN | 104672778 | A | 6/2015 | |
| CN | 106947212 | A * | 7/2017 | C08L 59/04 |
| CN | 107459760 | A | 12/2017 | |
| DE | 102006050101 | A1 | 7/2007 | |
| EP | 1522554 | A1 | 4/2005 | |
| EP | 1674526 | | 6/2006 | |
| JP | H01275653 | A | 11/1989 | |
| JP | H02279515 | A | 11/1990 | |
| JP | H04293952 | A | 10/1992 | |
| JP | H05222268 | A | 8/1993 | |
| JP | H07228751 | A | 8/1995 | |
| JP | H08231821 | A | 9/1996 | |
| JP | H08231822 | A | 9/1996 | |
| JP | 2592457 | B2 * | 3/1997 | C08L 59/00 |
| JP | H09235447 | A | 9/1997 | |
| JP | H09235448 | A | 9/1997 | |
| JP | H09278852 | A | 10/1997 | |
| JP | H10120746 | A | 5/1998 | |
| JP | H11302497 | A | 11/1999 | |
| JP | 2000/017144 | A | 1/2000 | |
| JP | 2001/011143 | A | 1/2001 | |
| JP | 2003/113289 | A | 4/2003 | |
| JP | 2004/204172 | A | 7/2004 | |
| JP | 2006/169310 | A | 6/2006 | |
| JP | 2006/321880 | A | 11/2006 | |
| JP | 2007/070375 | A | 3/2007 | |
| JP | 2007/070574 | A | 3/2007 | |
| JP | 2007/070575 | A | 3/2007 | |
| JP | 2007/112959 | A | 5/2007 | |
| JP | 2007/145979 | A | 6/2007 | |
| JP | 2007/145980 | A | 6/2007 | |
| JP | 2007534787 | A | 11/2007 | |
| JP | 2007/332227 | A | 12/2007 | |
| JP | 2008/031348 | A | 2/2008 | |
| JP | 2008024947 | A | 2/2008 | |
| JP | 2009/286874 | A | 12/2009 | |
| JP | 2010031200 | A * | 2/2010 | |
| JP | 2010/265438 | A | 11/2010 | |
| JP | 2012/246337 | A | 12/2012 | |
| JP | 2012237009 | A | 12/2012 | |
| JP | 2013/185027 | A | 9/2013 | |
| JP | 2014/122298 | A | 7/2014 | |
| JP | 2014/148625 | A | 8/2014 | |
| JP | 2015504027 | A | 2/2015 | |
| JP | 2015209499 | A * | 11/2015 | C08K 3/34 |
| JP | 2016/011398 | A | 1/2016 | |
| JP | 2016/501963 | A | 1/2016 | |
| JP | 2016069453 | A | 5/2016 | |
| JP | 2018/172456 | A | 11/2018 | |
| JP | 6691171 | B2 | 4/2020 | |
| WO | WO99/05217 | A1 | 2/1999 | |
| WO | WO2004/058875 | A1 | 7/2004 | |
| WO | WO2011/111823 | A1 | 9/2011 | |
| WO | WO2019236368 | A1 | 12/2019 | |
| WO | WO2023107679 | A1 | 6/2023 | |

OTHER PUBLICATIONS

JP2010031200A English translation (Year: 2010).*

ASTM D1238 vs ISO 1133 (Year: 2024).*

JP2015209499A English (Year: 2015).*

JP2592457 B2 machine English translation (Year: 1997).*

International Search Report Corresponding to Application No. PCT/US 22/16421 on May 2, 2022.

Kyowamag MF-150 by Kyowa Chemical Industry Co., Ltd published on Oct. 1, 2015, 2 pages.

Liu, et al., Study on the Thermal Stability of POM/FE Powder Composites, Article, 38(3), 2010, pp. 60-62.

Product Information—Hostaform ® C 13031 XF/POM/Specialty, Ticona Engineering Polymers, Jan. 2007, 4 pages.

Product Information—Hostaform ® C 13031 XF/POM/Specialty, Ticona Performance Solutions, Oct. 2013, 4 pages.

Product Information—Hostaform ® Polyoxymethylene Copolymer (POM), Ticona, Published Dec. 2006, 84 pages.

Fink, "Polymerization and Manufacture of Polyoxymethylene", Polyoxymethylene Handbook, Scrivener Publishing, 2014, Chapter 2, pp. 21-51.

Archodoulake et al., "Thermal Properties and Flammability of Polyoxymethylene", Polyoxymethylene Handbook, Scrivener Publishing, 2014, Chapter 10, pp. 257-275.

Lüftl et al., "Chemical Resistance of Polyoxymethylene", Polyoxymethylene Handbook, Scrivener Publishing, 2014, Chapter 11, pp. 277-299.

Berardinelli et al., "Degradation and Stabilization" of Polyacetal Copolymers, Journal of Applied Polymer Science, vol. 9, 1965, pp. 1419-1429.

Richaud, "Polyoxymethylene Additives", Polyoxymethylene Handbook, Scrivener Publishing, 2014, Chapter 3, pp. 53-105.

Chinese Office Action Corresponding to Application No. 202280028632.1 on Aug. 4, 2025.

Translation of Japanese Office Action Corresponding to Application No. 2023-548618 on Feb. 18, 2026.

* cited by examiner

POLYOXYMETHYLENE POLYMER COMPOSITION THAT IS MEDIA RESISTANT

RELATED APPLICATIONS

The present application is based upon and claims priority to U.S. Provisional Patent Application Ser. No. 63/149,915, having a filing date of Feb. 16, 2021, which is incorporated herein by reference.

BACKGROUND

Polyacetal polymers, which are commonly referred to as polyoxymethylene polymers, have become established as exceptionally useful engineering materials in a variety of applications. Polyoxymethylene polymers, for instance, are widely used in constructing molded parts, such as parts for use in the automotive industry and the electrical industry. Polyoxymethylene polymers, for instance, have excellent mechanical property, fatigue resistance, abrasion resistance, chemical resistance, and moldability.

Because of their excellent mechanical properties, heat resistance and chemical resistance, polyoxymethylene polymers have been used in the past to produce components for various vehicles, such as cars and trucks. For example, because polyoxymethylene polymers do not significantly degrade when contacted with fuels, molded parts made from polyoxymethylene polymers have been used to produce fuel lines and other vehicle parts where the part is repeatedly contacted with vehicle fuels. In addition to being fuel resistant, the polyoxymethylene polymer compositions also have good impact resistance properties which makes molded parts made from the polymers resistant to damage or crack formation during normal wear and tear.

Particular problems, however, are faced when polyoxymethylene compositions are designed to contact diesel fuel. Diesel fuel, for instance, can contain sulfur or sulfur-containing compounds. When the diesel fuel is heated for prolong periods of time, the sulfur-containing compounds can oxidize and produce acidic sulfur compounds, which can decompose many different synthetic polymers, including having some effect on polyoxymethylene polymers. Thus, in the past, polyoxymethylene polymers have been combined with various different additives such as a hindered amine light stabilizer or a zinc oxide in order to make the polymer more resistant to contact with corrosive agents that may form from diesel fuel.

Recently, more and more cars and trucks are being made with decorative rims for the tires of the vehicle. In many instances, the decorative rims are made from a polished metal, chrome, or the like. In order to clean these materials, consumers and commercial car and truck washing establishments typically use a wheel cleaner that is highly acidic. For example, a wheel cleaner can have a pH below 3, and even below 2. These wheel cleaners are commonly sprayed onto fuel components of the car during application to the wheel. These highly acidic solutions can cause rapid aging of the fuel components, causing the components to degrade and fail over time.

In view of the above, those skilled in the art have attempted to formulate polyoxymethylene polymer compositions that are resistant to acids. For example, U.S. Pat. No. 7,247,665 and United States Patent Publication No. 2018/0319980, which are both incorporated herein by reference, disclose polyoxymethylene polymer compositions with improved acid resistance. Although both of the above patent publications disclose compositions that have displayed significant improvements in the art, further improvements in acid resistance is still needed.

Thus, a need currently exists for a polyoxymethylene polymer composition that is resistant to highly acidic solutions, such as wheel cleaners.

SUMMARY

In general, the present disclosure is directed to a polymer composition containing primarily a polyoxymethylene polymer and to molded products made from the composition. The polymer composition of the present disclosure is particularly formulated to be acid resistant. More particularly, the polymer composition of the present disclosure and articles molded from the composition are well suited for contact with various fuels including diesel fuels and for contact with highly acidic liquids, such as various cleaning agents. Even after repeated contact with fuels and acidic solutions for extended periods of time, articles molded in accordance with the present disclosure do not degrade, crack or otherwise fail.

In one embodiment, for instance, the polymer composition of the present disclosure comprises a polyoxymethylene polymer in combination with at least one acid neutralizing agent and a plasticizer. More particularly, the composition not only contains a polyoxymethylene polymer in an amount greater than at least 60% by weight, but also contains at least one acid neutralizing agent that comprises a magnesium compound and a plasticizer.

The polyoxymethylene polymer, for instance, may comprise a polyoxymethylene copolymer and may be present in the polymer composition in an amount greater than about 70% by weight, such as in an amount greater than about 80% by weight, such as in an amount greater than about 90% by weight. In one embodiment, the polyoxymethylene polymer is present in the polymer composition in an amount less than about 96% by weight, such as in an amount less than about 95% by weight. The polyoxymethylene polymer can have a melt flow index of greater than about 5 g/10 min, such as greater than about 9 g/10 min, such as greater than about 10 g/10 min, such as greater than about 11 g/10 min when measured according to ISO Test 1133 at 190° C. and at a load of 2.16 kg. The melt flow index is generally less than about 40 g/10 min, such as less than about 35 g/10 min, such as less than about 30 g/10 min. In one embodiment, the melt flow index is from about 10 g/10 min to about 15 g/10 min.

In one embodiment, the polyoxymethylene polymer present in the polymer composition is a polyoxymethylene copolymer containing relatively low amounts of comonomer. The comonomer content, for instance, can be less than about 2% by weight, such as in an amount less than about 1.8% by weight, such as in an amount less than about 1.7% by weight, such as in an amount less than about 1.6% by weight. The comonomer content of the polyoxymethylene copolymer can generally be greater than about 0.3% by weight, such as greater than about 0.5% by weight, such as greater than about 0.8% by weight, such as greater than about 1.1% by weight. A polyoxymethylene copolymer having controlled comonomer content as described above has been found to further increase the acid resistance of the polymer composition. In certain aspects, it is believed that combining a polyoxymethylene copolymer having a relatively low comonomer content can synergistically work in conjunction with one or more acid neutralizing agents to provide optimum acid resistance in certain applications.

As described above, the polyoxymethylene polymer is combined with at least one acid neutralizing agent and a plasticizer. The acid neutralizing agent, in one aspect, comprises one or more magnesium compounds. In certain embodiments, for instance, the use of magnesium compounds can provide optimum acid resistance due to the physical properties of the particles. The magnesium compound, for instance, can be a hydroxide, an oxide, a carbonate, or the like. In one aspect, for instance, the acid neutralizing agent comprises only magnesium hydroxide. Alternatively, the acid neutralizing agent can comprise only magnesium oxide. In still another embodiment, a combination of magnesium hydroxide and magnesium oxide may be used.

In one aspect, the total amount of acid neutralizing agents present in the polymer composition can be based on the amount of magnesium present in the polymer composition. The amount of magnesium contained in the composition, for instance, can be calculated from the molecular weight of the magnesium compounds. For example, the total amount of all acid neutralizing agents present in the polymer composition can provide a weight percent of magnesium of greater than about 1.8% by weight and less than about 4.1% by weight, including all increments of 0.1% by weight therebetween. Each magnesium compound, whether the compound is magnesium hydroxide, magnesium oxide, or other magnesium compound, can generally be present in the polymer composition such that the magnesium compound provides the polymer composition with a weight percent of magnesium of greater than about 0.6% by weight, such as greater than about 0.8% by weight, such as greater than about 1% by weight, such as greater than about 1.2% by weight, such as greater than about 1.4% by weight, such as greater than about 1.6% by weight, such as greater than about 1.8% by weight, such as greater than about 2% by weight, and generally less than about 4.1% by weight, such as less than about 3.8% by weight, such as less than about 3.5% by weight, such as less than about 3.3% by weight, such as less than about 3% by weight.

As described above, the polymer composition further contains a plasticizer. The plasticizer, for instance, may comprise a polyalkylene glycol. The polyalkylene glycol, for instance, can have a mean molecular weight of greater than about 2,000 g/mol, such as from about 3,000 g/mol to about 9,000 g/mol. The plasticizer can generally be present in the polymer composition in an amount greater than about 1% by weight, such as in an amount greater than about 1.3% by weight, such as in an amount greater than about 1.7% by weight, and generally in an amount less than about 10% by weight, such as in an amount less than about 5% by weight, such as in an amount less than about 4% by weight, such as in an amount less than about 3.3% by weight, such as in an amount less than about 2.8% by weight.

In other embodiments, the plasticizer may comprise an aromatic ester including aromatic polyesters, an aliphatic diester, an epoxide, a sulfonamide, a polyether, a polybutene, a polyamide, an acetylated monoglyceride, an alkyl citrate, or an organophosphate.

Various other components can be present in the polymer composition to provide various benefits and advantages. In general, each of the other ingredients and components can be contained in the composition in an amount from about 0.1% by weight to about 10% by weight, such as from about 0.1% by weight to about 2.5% by weight.

In one aspect, the polymer composition contains one or more antioxidants. For instance, the polymer composition can contain a primary antioxidant comprising a hindered phenolic antioxidant. The hindered phenolic antioxidant can be present in the polymer composition in an amount greater than about 0.3% by weight, such as in an amount greater than about 0.5% by weight, such as in an amount greater than about 0.7% by weight. The phenolic antioxidant can be present in the polymer composition generally in an amount less than about 2.5% by weight, such as in an amount less than about 2.2% by weight, such as in an amount less than about 1.8% by weight, such as in an amount less than about 1.5% by weight.

In one embodiment, one or more secondary antioxidants are present in the polymer composition. For instance, a hindered phenolic antioxidant as described above can be combined with an aromatic amine antioxidant, a thiodipropionate antioxidant, or combinations thereof. For example, in one particular embodiment, the polymer composition contains an aromatic amine antioxidant in an amount greater than about 0.08% by weight, such as in an amount greater than about 0.1% by weight, such as in an amount greater than about 0.18% by weight, such as in an amount greater than about 0.22% by weight, such as in an amount greater than about 0.27% by weight, and generally in an amount less than about 0.7% by weight, such as in an amount less than about 0.5% by weight, such as in an amount less than about 0.4% by weight. A thiodipropionate can also be present, such as distearyl thiodipropionate, in an amount greater than about 0.05% by weight, such as in an amount greater than about 0.08% by weight, such as in an amount greater than about 0.12% by weight, such as in an amount greater than about 0.16% by weight, and generally in an amount less than about 0.7% by weight, such as in an amount less than about 0.5% by weight, such as in an amount less than about 0.3% by weight.

The polymer composition can also contain a wax. The wax, for instance, can be an ethylene bis(stearamide). The wax can be present in the polymer composition in an amount greater than about 0.05% by weight, such as in an amount greater than about 0.1% by weight, such as in an amount greater than about 0.15% by weight, such as in an amount greater than about 0.18% by weight, and generally in an amount less than about 2% by weight, such as in an amount less than about 1% by weight, such as in an amount less than about 0.8% by weight, such as in an amount less than about 0.7% by weight.

The polymer composition can also contain a salt of a carboxylic acid, such as a salt of a hydroxycarboxylic acid. In one aspect, the polymer composition contains calcium hydroxystearate. The carboxylic acid compound, for instance, can be present in the polymer composition in an amount greater than about 0.1% by weight, such as in an amount greater than about 0.2% by weight, and generally in an amount less than about 1.5% by weight, such as in an amount less than about 1% by weight, such as in an amount less than about 0.5% by weight.

As described above, the polymer composition is well suited for producing molded articles that are to contact fuel, such as diesel fuel. The polymer composition is also resistant to highly acidic solutions. In one embodiment, for instance, the polymer composition may be used to produce an exterior vehicle part. The molded article, for instance, may comprise a portion of the fuel system of a car or truck. In one embodiment, for example, the molded article may comprise a fuel contacting member. The fuel contacting member may comprise a fuel line or a fuel flange.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
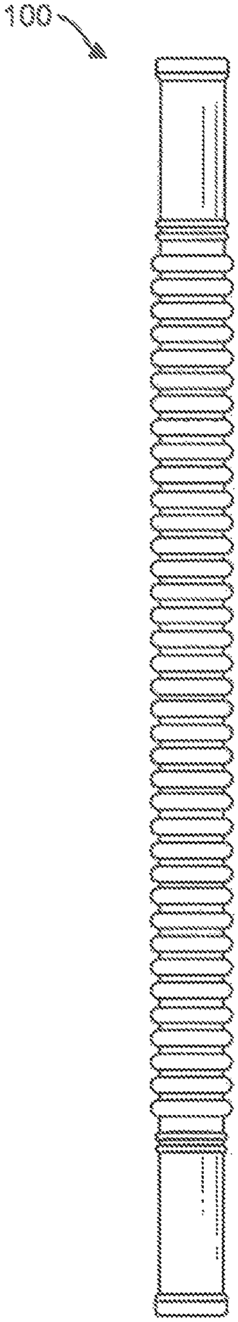
FIG. 1 is a side view of one embodiment of a fuel line made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polyoxymethylene polymer composition and to polymer articles made from the composition. The polymer composition contains a polyoxymethylene polymer and has fuel resistant properties, particularly diesel fuel resistant properties. In addition, the polymer composition of the present disclosure is also specially formulated to be resistant to highly acidic solutions. In particular, the polymer composition of the present disclosure is resistant to highly acidic solutions or acidic byproducts that may come in contact with the fuel system of a car or truck. The highly acidic solution, for instance, may comprise a wheel cleaner, a rim cleaner, a chrome cleaner or the like. In the past, polyoxymethylene polymer compositions have been formulated so as to be diesel fuel resistant. Such formulations, however, may be susceptible to damage or degradation when contacted with a wheel or rim cleaner solution that is inadvertently contacted with parts or articles that make up the fuel system. In order to produce a polymer composition that is resistant to highly acidic liquids, various different components are selected that may, in one embodiment, be combined with a particular type of polyoxymethylene copolymer. In general, for instance, the polymer composition contains one or more acid neutralizing agents. At least one acid neutralizing agent is present in the polymer composition that comprises a magnesium compound. One or more magnesium compounds are present in the polymer composition so as to provide a specific amount of magnesium content that has been found to be optimum for acid resistance.

In addition to one or more magnesium compounds, the polymer composition can also contain one or more antioxidants. Various different antioxidants can be selected alone or in combination to further improve the ability of polymer articles made according to the present disclosure to withstand contact with acids and/or fuels.

As described above, in one embodiment, the polymer composition can also contain a particular type of polyoxymethylene polymer. The polyoxymethylene polymer, for instance, can be a copolymer containing controlled amounts of a comonomer, such as dioxolane.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —$CH_2O$-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

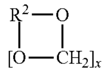

in which x is 0 or 1 and $R^2$ is a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

In one embodiment, the polyoxymethylene polymer present in the polymer composition is a copolymer containing relatively low amounts of comonomer, such as dioxolane. For example, the polyoxymethylene copolymer can contain comonomer units in an amount less than about 2% by weight, such as in an amount less than about 1.8% by weight, such as in an amount less than about 1.7% by weight, such as in an amount less than about 1.6% by weight. The comonomer content of the polyoxymethylene copolymer can generally be greater than about 0.3% by weight, such as in an amount greater than about 0.5% by weight, such as in an amount greater than about 0.7% by weight, such as in an amount greater than about 0.9% by weight, such as in an amount greater than about 1.1% by weight, such as in an amount greater than about 1.3% by weight.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —$NH_2$ groups.

In one embodiment, the polyoxymethylene polymer can optionally have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer optionally has a content of terminal hydroxyl groups of at least 15 mmol/kg, such as at least 18 mmol/kg, such as at least 20 mmol/kg. In one embodiment, the terminal hydroxyl group content ranges from 18 to 80 mmol/kg. In an alternative embodiment, the polyoxymethylene polymer may contain terminal hydroxyl groups in an amount less than 100 mmol/kg, such as less than 50 mmol/kg, such as less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of $-CH_2O-$ repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 200,000 g/mol.

The polyoxymethylene polymer present in the composition can generally have a melt flow index (MFI) ranging from about 1 to about 50 g/10 min, such as from about 9 g/10 min to about 27 g/10 min as determined according to ISO Test 1133 at 190° C. and 2.16 kg, though polyoxymethylenes having a higher or lower melt flow index are also encompassed herein. In one embodiment, the polyoxymethylene polymer has a melt flow index of generally greater than about 10 g/10 min. For example, the polyoxymethylene polymer can have a melt flow index of greater than about 11 g/10 min, greater than about 12 g/10 min. The melt flow index of the polyoxymethylene polymer can be less than about 35 g/10 min, such as less than about 30 g/10 min, such as less than about 25 g/10 min, such as less than about 20 g/10 min, such as less than about 14 g/10 min.

Suitable commercially available polyoxymethylene polymers are available under the trade name Hostaform® (HF) by Celanese/Ticona.

The polyoxymethylene polymer may be present in the polyoxymethylene polymer composition in an amount of at least 60 wt. %, such as at least 70 wt. %, such as at least 75 wt. %, such as at least 80 wt. %, such as at least 85 wt. %, such as at least 90 wt. %, such as at least 93 wt. %. In general, the polyoxymethylene polymer is present in an amount of less than about 100 wt. %, such as less than about 97 wt. %, such as less than about 95 wt. %, wherein the weight is based on the total weight of the polyoxymethylene polymer composition.

According to the present disclosure, the polyoxymethylene polymer is combined with at least one acid neutralizing agent and a plasticizer. The acid neutralizing agent generally comprises a metal compound and/or a hydroxide, an oxide, a sulfide or a carbonate.

In one aspect, at least one of the acid neutralizing agents is a magnesium compound. For instance, the polymer composition of the present disclosure can contain a single magnesium compound or a plurality of magnesium compounds. Magnesium compounds particularly well suited for use in the present disclosure include magnesium hydroxide alone, magnesium oxide, or a combination magnesium hydroxide and magnesium oxide. In accordance with the present disclosure, one or more magnesium compounds are added to the polymer composition so as to achieve a particular magnesium content found to be particularly well suited for providing acid resistance. The magnesium content of the polymer composition, for instance, can be greater than about 1.8% by weight, such as greater than about 2% by weight, such as greater than about 2.2% by weight, such as greater than about 2.4% by weight, such as greater than about 2.6% by weight, such as greater than about 2.8% by weight, such as greater than about 3% by weight, such as greater than about 3.2% by weight, such as greater than about 3.4% by weight, such as greater than about 3.6% by weight. The magnesium content of the polymer composition is generally less than about 8.5% by weight, such as less than about 7% by weight, such as less than about 6% by weight, such as less than about 5% by weight. In one embodiment, the magnesium content of the polymer composition is less than about 4.1% by weight.

In one embodiment, the polymer composition contains only magnesium oxide. The magnesium oxide can be present in the polymer composition in an amount sufficient for the polymer composition to have a magnesium content of from about 2.5% by weight to about 6.5% by weight.

In an alternative embodiment, the polymer composition can contain magnesium hydroxide alone or in combination with magnesium oxide. The magnesium hydroxide can be present in the polymer composition such that the magnesium hydroxide contributes from about 0.6% to about 4.5% by weight of magnesium to the polymer composition. For instance, magnesium hydroxide can be added to the polymer composition so as to provide a magnesium content of greater than about 0.8% by weight, such as greater than about 1.2% by weight, such as greater than about 1.5% by weight, such as greater than about 1.8% by weight, such as greater than about 2% by weight, such as greater than about 2.2% by weight, such as greater than about 2.5% by weight, such as greater than about 2.8% by weight, such as greater than about 3% by weight, such as greater than about 3.2% by weight, such as greater than about 3.5% by weight, and generally less than about 6.3% by weight, such as less than about 5.5% by weight, such as less than about 4.1% by weight. As described above, magnesium hydroxide can be present alone or in combination with magnesium oxide. When magnesium oxide is present in combination with magnesium hydroxide, the magnesium oxide can also be present so as to provide a magnesium content to the polymer composition in the same amounts as described above with respect to magnesium hydroxide.

In addition to one or more magnesium compounds, various other acid neutralizing agents can also be added to the polymer composition. For instance, other acid neutralizing agents that may be used include zinc oxide, zinc sulfide, sulfur sulfide, calcium carbonate, or mixtures thereof.

In one embodiment, the acid neutralizing agent can have a relatively small particle size combined with a high surface area. Each acid neutralizing agent, for example, can have a BET surface area of greater than about 25 $m^2/g$, such as greater than about 35 $m^2/g$, such as greater than about 45 $m^2/g$, such as greater than about 55 $m^2/g$, such as greater than about 65 $m^2/g$, such as greater than about 75 $m^2/g$, such as greater than about 85 $m^2/g$, such as greater than about 95 $m^2/g$, such as greater than about 105 $m^2/g$, such as greater than about 115 $m^2/g$, such as greater than about 125 $m^2/g$, such as greater than about 135 $m^2/g$, such as greater than about 145 $m^2/g$, such as greater than about 155 $m^2/g$, such as greater than about 165 $m^2/g$, such as greater than about 175 $m^2/g$, such as greater than about 185 $m^2/g$, such as greater than about 195 $m^2/g$, such as greater than about 205 $m^2/g$, such as greater than about 215 $m^2/g$. The BET surface area is generally less than about 400 $m^2/g$.

In addition to the polyoxymethylene polymer and an acid neutralizing agent, the polymer composition further contains a plasticizer. The plasticizer can comprise a polyalkylene glycol, an ester, a polyester, an epoxide, a sulfonamide, a polyether, a polyamide, a polybutene, an acetylated monoglyceride, an alkyl citrate, an organophosphate, or mixtures thereof.

For instance, in one embodiment, the plasticizer comprises polyethylene glycol. The mean molecular weight of the plasticizer can generally be greater than about 1,000 g/mol, such as greater than about 3,000 g/mol, such as greater than about 5,000 g/mol. The mean molecular weight of the plasticizer is generally less than about 55,000 g/mol, such as less than about 30,000 g/mol, such as less than about 15,000 g/mol, such as less than about 8,000 g/mol.

In an alternative embodiment, the plasticizer may have ester functionality and may comprise a phthalate, an adipate, a sebacate, a maleate, a trimellitate, a benzoate, or mixtures thereof. Examples of suitable phthalates are diisobutyl phthalate (DIBP), dibutyl phthalate (DBP), diisoheptyl phthalate (DIHP), L 79 phthalate, L711 phthalate, dioctyl phthalate, diisooctyl phthalate, dinonyl phthalate, diisononyl phthalate, diisodecyl phthalate, L911 phthalate, diundecyl phthalate, diisoundecyl phthalate, undecyl dodecyl phthalate, diisotridecyl phthalate (DTDP) and butyl benzyl phthalate (BBP).

Examples of adipates are dioctyl adipate, diisononyl adipate and diisodecyl adipate. An example for a trimellitate is trioctyl trimellitate. Phosphate esters can also be used. Suitable examples are tri-2-ethylhexyl phosphate, 2-Ethylhexyl diphenyl phosphate and tricresyl phosphate.

Sebacates and azelates include di-2-ethylhexyl sebacate (DOS) and di-2-ethylhexyl azelate (DOZ).

Polyester plasticizers are typically based on condensation products of propane- or butanediols with adipic acid or phthalic anhydride. The growing polymer chain of these polyesters may then be end-capped with an alcohol or a monobasic acid, although non-end-capped polyesters can be produced by strict control of the reaction stoichiometry.

Further plasticizers are benzoates which are commercially available as JAYFLEX® MB10, BENZOFLEX®2088, BENZOFLEX® LA-705, and BENXOFLEX® 9-88. Epoxide based plasticizer include epoxidized vegetable oils.

In one embodiment, the plasticizer is an aromatic benzene sulfonamides. Preference is given to benzene sulfonamides represented by the general formula (I):

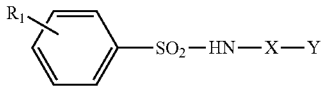

in which R1 represents a hydrogen atom, a $C_1$-$C_4$ alkyl group or a $C_1$-$C_4$ alkoxy group, X represents a linear or branched $C_2$-$C_{10}$ alkylene group, or an alkyl group, or a methylene group, or a cycloaliphatic group, or an aromatic group, and Y represents one of the groups H, OH or

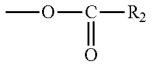

in which $R_2$ represents a $C_1$-$C_4$ alkyl group or an aromatic group, these groups optionally themselves being substituted by an OH or $C_1$-$C_4$ alkyl group.

The preferred aromatic benzenesulphonamides of formula (I) are those in which:

$R_1$ represents a hydrogen atom or a methyl or methoxy group, X represents a linear or branched $C_2$-$C_{10}$ alkylene group or a phenyl group, Y represents an H, OH or —O—CO—$R_2$ group, $R_2$ representing a methyl or phenyl group, the latter being themselves optionally substituted by an OH or methyl group.

Mention may be made, among the aromatic sulphonamides of formula (I) which are liquid (L) or solid (S) at room temperature as specified below, of the following products, with the abbreviations which have been assigned to them:

N-(2-hydroxyethyl)benzenesulphonamide (L),
N-(3-hydroxypropyl)benzenesulphonamide (L),
N-(2-hydroxyethyl)-p-toluenesulphonamide (S),
N-(4-hydroxyphenyl)benzenesulphonamide (S),
N-[(2-hydroxy-1-hydroxymethyl-1-methyl)ethyl]benzenesulphonamide (L),
N-[5-hydroxy-1,5-dimethylhexyl]benzenesulphonamide (S),
N-(2-acetoxyethyl)benzenesulphonamide (S),
N-(5-hydroxypentyl)benzenesulphonamide (L),
N-[2-(4-hydroxybenzoyloxy)ethyl]benzene-sulphonamide (S),
N-[2-(4-methylbenzoyloxy)ethyl]benzenesulphonamide (S),
N-(2-hydroxyethyl)-p-methoxybenzenesulphonamide (S) and
N-(2-hydroxypropyl)benzenesulphonamide (L).

One particular plasticizer is a sulfonamide, for example N-(n-butyl)benzene sulfonamide.

The amount of plasticizer present in the polymer composition can depend upon the amount of acid neutralizing agent present as well as various other factors. In general, the plasticizer is present in the composition in an amount greater than about 0.8% by weight, such as in an amount greater than about 1.2% by weight, such as in an amount greater than about 1.6% by weight, such as in an amount greater than about 1.8% by weight. The plasticizer is generally present in an amount less than about 12% by weight, such as in an amount less than about 8% by weight, such as in an amount less than about 6% by weight, such as in an amount less than about 3% by weight.

In addition to the polyoxymethylene polymer, at least one acid neutralizing agent, and the plasticizer, various other components and ingredients can be contained in the composition for improving one or more properties. For example, in one embodiment, the composition may contain a conductive filler so that any article molded from the composition exhibits electrostatic dissipative (ESD) capabilities. The conductive filler can include conductive particles, powders, fibers or combinations thereof. For instance, the conductive filler may comprise metal powders, metal flakes, metal fibers (i.e., stainless steel fibers), carbon powder, carbon fibers, carbon black, carbon nanotubes, or combinations thereof.

Further, the conductive filler can be present in the polymer composition of the present disclosure in an amount ranging from about 1% by weight to about 30% by weight, such as in an amount ranging from about 1.5% by weight to about 25% by weight, such as in an amount ranging from about 2% by weight to about 20% by weight, based on the total weight of the polymer composition.

In one aspect, one or more antioxidants may be present in the polymer composition. For example, in one embodiment, a sterically hindered phenol may be present. Examples which are available commercially, are pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl)propionohydrazide], and hexamethylene glycol bis[3-(3,5-di-tert-butyl-4-hydroxyphenyl)propionate]. The antioxidant may be present in the polymer composition in an amount of at least about 0.1 wt. %, such as at least about 0.5 wt. %, such as at least about 0.8 wt. %, such as at least about 1.1% by weight, and less than about 4 wt. %, such as less than about 3 wt. %, such as less than about 2 wt. %, wherein the weight is based on the total weight of the respective polymer composition.

In addition to a sterically hindered phenol, various other antioxidants may be incorporated into the present disclosure. In fact, in one embodiment, a plurality of antioxidants may be incorporated into the polymer composition for providing one or more advantages, including making the polymer more resistant to degradation after contact with acids, fuels, heat, or the like. Other antioxidants that can be incorporated into the polymer composition include aromatic amines. The aromatic amine can also serve as a thermal stabilizer. In one embodiment, the aromatic amine antioxidant is 4-(1-methyl-1-phenylethyl)N-[4-(1-methyl-1-phenylethyl)phenyl]aniline. The aromatic amine antioxidant can be present in the polymer composition in an amount greater than about 0.1% by weight, such as in an amount greater than about 0.15% by weight, such as in an amount greater than about 0.2% by weight, such as in an amount greater than about 0.25% by weight, such as in an amount greater than about 0.27% by weight, and generally in an amount less than about 2% by weight, such as in an amount less than about 1% by weight, such as in an amount less than about 0.8% by weight, such as in an amount less than about 0.5% by weight.

Another antioxidant that may be present in the polymer composition is a thiodipropionate, such as distearyl thiodipropionate. The thiodipropionate antioxidant can be present in the polymer composition in an amount greater than about 0.08% by weight, such as in an amount greater than about 0.1% by weight, such as in an amount greater than about 0.15% by weight, such as in an amount greater than about 0.18% by weight, and generally in an amount less than about 1.8% by weight, such as in an amount less than about 1.3% by weight, such as in an amount less than about 0.8% by weight, such as in an amount less than about 0.5% by weight.

In one embodiment, a copolyamide can be present in the polymer composition for reducing formaldehyde emissions. The copolyamide can have a softening point of generally greater than about 120° C., such as greater than about 130° C., such as greater than about 140° C., such as greater than about 150° C., such as greater than about 160° C., such as greater than about 170° C. The softening point of the copolyamide may be less than about 210° C., such as less than about 200° C., such as less than about 190° C., such as less than about 185° C. The copolyamide may have a melt viscosity at 230° C. of greater than about 7 Pa s, such as greater than about 8 Pa s, such as greater than about 9 Pa s. The melt viscosity is generally less than about 15 Pa s, such as less than about 14 Pa s, such as less than about 13 Pa s. In one embodiment, the copolyamide is ethanol soluble. In one embodiment, the copolyamide may comprise a polycondensation product of polymeric fatty acids with aliphatic diamines. The copolyamide can generally be present in the composition in an amount greater than about 0.01% by weight, such as in an amount greater than about 0.03% by weight, such as in an amount greater than about 0.05% by weight. The copolyamide is generally present in an amount less than about 2% by weight, such as in an amount less than about 1.5% by weight, such as in an amount less than about 1% by weight, such as in an amount less than about 0.5% by weight, such as in an amount less than about 0.1% by weight.

In one embodiment, an acid scavenger may be present. The acid scavenger may comprise, for instance, an alkaline earth metal salt. For instance, the acid scavenger may comprise a calcium salt, such as a calcium citrate or a calcium carbonate. In one embodiment, the acid scavenger may comprise tricalcium citrate. The acid scavenger may be present in an amount of at least about 0.01 wt. %, such as at least about 0.05 wt. %, such as at least about 0.09 wt. %. In one embodiment, greater amounts of an acid scavenger are used, such as when the acid scavenger is a carbonate. For example, the acid scavenger can be present in an amount greater than about 2 wt. %, such as greater than about 5 wt. %, such as greater than about 7 wt. %. The acid scavenger is generally present in an amount less than about 10 wt. %, such as less than about 7 wt. %, such as less than about 5 wt. %, such as less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. In one embodiment, the terpolymer nucleant can have a relatively small particle size, such as having a d50 particle size of less than about 1 micron, such as less than about 0.8 microns, such as less than about 0.6 microns, such as less than about 0.4 microns, and generally greater than 0.01 microns. Other nucleants that may be used include a polyamide, boron nitride, or a talc. The polyamide nucleant may be PA6 or PA12. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, lubricants may be present. The lubricant may comprise a polymer wax composition. In one embodiment, a fatty acid amide such as ethylene bis(stearamide) may be present. In an alternative embodiment, the lubricant may comprise a polyalkylene glycol that has a relatively low molecular weight in relation to the plasticizer.

For instance, the lubricant may comprise a polyethylene glycol that has a mean molecular weight of from about 500 to about 4,000. Lubricants may generally be present in the polymer composition in an amount of at least about 0.01 wt. %, such as at least about 0.05 wt. %, such as at least about 0.1 wt. % and less than about 1 wt. %, such as less than about 0.75 wt. %, such as less than about 0.5 wt. %, wherein the weight is based on the total weight of the respective polymer composition.

In one embodiment, a coloring agent may be present. Coloring agents that may be used include any desired inorganic pigments, such as titanium dioxide, ultramarine blue, cobalt blue, and other organic pigments and dyes, such as phthalocyanines, anthraquinnones, and the like. Other coloring agents include carbon black or various other polymer-soluble dyes. In one embodiment, a combination of coloring agents may be included in the polymer composition. For instance, the polymer composition may contain carbon black. In an alternative embodiment, the coloring agents present in the polymer composition may comprise titanium dioxide in combination with at least one color pigment, such as a yellow pigment and a green pigment and optionally further in combination with carbon black. The coloring agent may be present in the composition in an amount of at least about 0.01 wt. %, such as at least about 0.05 wt. %, such as at least about 0.1 wt. %, such as at least about 0.5 wt. %, and less than about 5 wt. %, such as less than about 2.5 wt. %, such as less than about 1 wt. %, wherein the weight is based on the total weight of the respective polymer composition.

When a coloring agent is present, one or more light stabilizers may also be contained within the composition. In one embodiment, lights stabilizers, such as sterically hindered amines, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, however, the polymer composition is free of any light stabilizers. For instance, the composition may be free of an ultraviolet light stabilizer or a hindered amine light stabilizer.

In one aspect, a nitrogen-containing formaldehyde scavenger may optionally be present in the polymer composition. In an alternative embodiment, however, the polymer composition can be formulated so as to be completely free of any nitrogen-containing formaldehyde scavengers. Such formaldehyde scavengers, for instance, may interfere with the ability of the other components to provide acid resistance. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Such compounds are triamino-1,3,5-triazine (melamine) and its derivatives, such as melamine-formaldehyde condensates and methylol melamine. Other compounds include guanamine compounds.

The polymer composition may also optionally contain one or more reinforcing agents. For instance, the polymer composition may contain reinforcing fibers, such as glass fibers, carbon fibers, and the like. The reinforcing fibers can generally be present in an amount from about 2% to about 40% by weight, such as from about 10% to about 25% by weight.

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like.

In one embodiment, the polymer composition can be used to produce polymer articles designed for the automotive field. The polymer articles, for instance, may be designed to be an exterior vehicle part. In one embodiment, the molded articles are formed into a fuel contacting member. The fuel contacting member, for instance, may be one or more parts contained in the fuel system of a vehicle, such as a car or truck. The fuel contacting member, for instance, may be designed for repeated contact with diesel fuel.

Referring to FIG. 1, for instance, a fuel line 100 is shown formed from the polymer composition of the present disclosure. The fuel line 100, for instance, comprises, in this embodiment, a corrugated tube.

In addition to fuel lines, the polymer composition of the present disclosure can be used to produce fuel tanks, components of a fuel pump, components of a fuel filter, a fuel rail, components of an injector, a pressure regulator, and a return fuel line.

Figure 2:
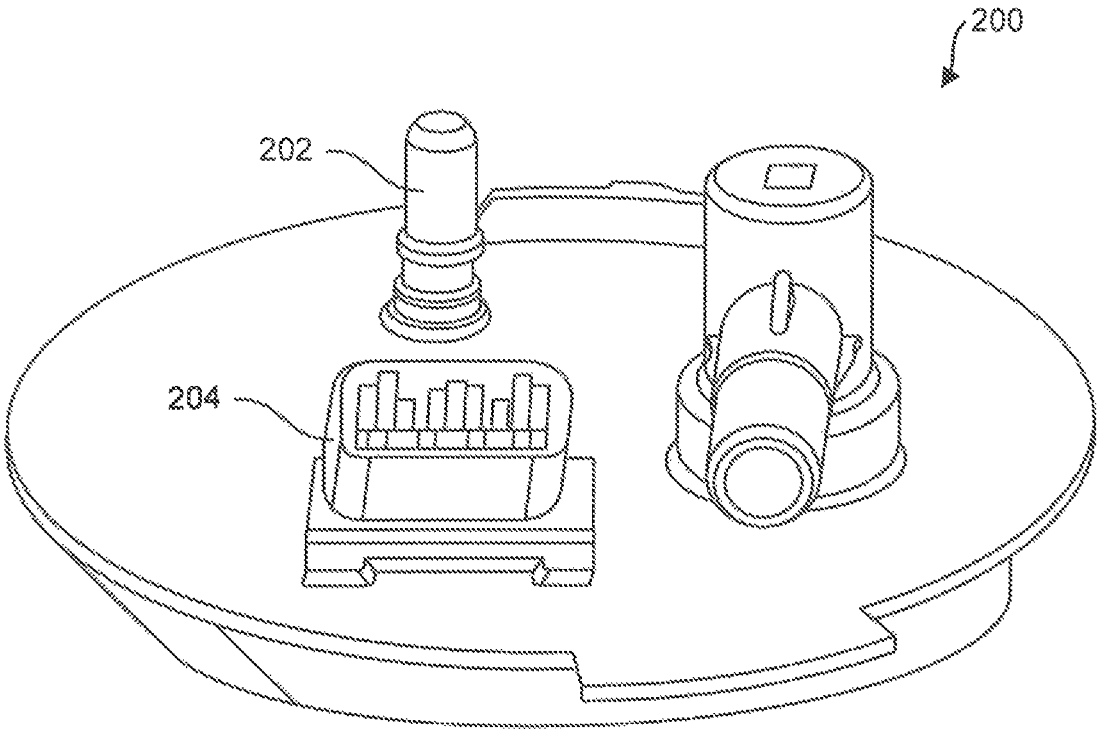
FIG. 2 is a perspective view of one embodiment of a fuel flange made in accordance with the present disclosure.

In one embodiment, the polymer composition is used to produce a fuel flange 200 as shown in FIG. 2. The fuel flange 200, for instance, is designed to be placed on a fuel tank and connected to one or more fuel lines. For example, as shown in FIG. 2, the fuel flange 200 can include at least one fuel inlet or outlet 202 for feeding fuel to a fuel tank and for dispensing fuel from the fuel tank. The fuel flange 200 can also include an electrical connector 204 for connecting a controller contained within the vehicle to various sensors that may be present in and around the fuel tank.

The polymer composition can possess a combination of physical properties and acid resistance that makes the polymer composition well suited for many applications in addition to being used in fuel related applications. For example, when tested according to GM test GMW18052, the polymer composition displays an acid resistance of greater than 30 cycles to maintain 75% tensile stress and greater than 10 cycles to maintain 35% tensile stress, displays a tensile modulus of greater than 2500 MPa, displays a tensile strength at yield of greater than 54 MPa, displays a Charpy notched impact strength at 23 C of greater than 4 $kJ/m^2$, displays a Charpy notched impact strength at −30 C of greater than 3 $kJ/m^2$, displays a density of from 1.4 $g/cm^3$ to 1.46 $g/cm^3$, displays a melting temperature of from 168 C to 175 C, displays a DTUL of greater than 90 C, and displays a melt flow rate of from 9 g/10 min to 16 g/16 min. For example, the polymer composition can display a tensile modulus of greater than 2800 MPa, such as greater than 3000 MPa and generally less than 4500 MPa, displays a tensile strength at yield of greater than 56 MPa, such as greater than 58 MPa and generally less than 70 MPa, displays a Charpy notched impact strength at 23 C of greater than about 5 $kJ/m^2$, such as greater than about 5.5 $kJ/m^2$ and generally less than about 9 $kJ/m^2$, displays a Charpy notched impact strength at −30 C of greater than about 5 $kJ/m^2$, such as greater than about 5.4 $kJ/m^2$, and generally less than about 8.5 $kJ/m^2$.

The present disclosure may be better understood with reference to the following example.

EXAMPLES

The following examples are provided to further illustrate the invention but not to limit its scope. Other variants of the invention will be readily apparent to one of ordinary skill in the art and are encompassed by the appended claims.

Example 1

In this example, various polymer compositions were formulated and tested for resistance against a highly acidic solution. The polymer compositions were also test for various physical properties.

The following polymer compositions were formulated:

| Components | Sample 1 wt. % | Sample 2 wt. % |
|---|---|---|
| Polyoxymethylene copolymer (MFI = 13 g/10 min, 1.5% wt. dioxolane content) | 90.2 | 90.3 |
| Phenolic antioxidant | 1.3 | 0.7 |
| Aromatic Amine antioxidant CAS # 10081671 | 0 | 0.3 |
| Distearyl thiodipropionate CAS # 693367 | 0 | 0.2 |
| Ethylene bis(stearamide) | 0.2 | 0.2 |
| Calcium 12 hydroxy stearate | 0.3 | 0.3 |
| Polyethylene glycol (MW = 6,000) | 2 | 2 |
| Magnesium hydroxide particles | 3 | 0 |
| Magnesium oxide particles | 3 | 6 |

The above polymer compositions were molded into test plaques and tested as follows:

| | | Sample No. 1 | Sample No. 2 |
|---|---|---|---|
| Physical Properties | Melt Volume Rate (MVR) ($cm^3$/10 min) ISO 1133 | 17 | 15 |
| | MVR Test Temperature (° C.) ISO 1133 | 190 | 190 |
| | MVR Test Load (kg) ISO 1133 | 2.16 | 2.16 |
| | Density ISO 1183 $g/cm^3$ | 1.44 | 1.45 |
| Mechanical Properties | Tensile Modulus (23 C., 1 mm/min, between 0.05 to 0.25% strain) (MPa) ISO 527-2/1A | 3140 | 3280 |
| | Tensile Stress at yield (23 C., 50 mm/min) (MPa) ISO 527-2/1A | 60 | 60 |
| | Tensile elongation at yield (23 C., 50 mm/min) (%) ISO 527-2/1A | 12 | 11 |
| | Charpy Notched Impact Strength, 23° C. ($kJ/m^2$) ISO 179/1eA | 6.3 | 7.0 |
| | Charpy Notched Impact Strength, −30° C. ($kJ/m^2$) ISO 179/1eA | 5.8 | 5.6 |
| Thermal Properties | Melting Temperature (10° C./min) (° C.) ISO 11357-3 | 170 | 170 |
| | DTUL at 1.8 MPa (° C.) ISO 75-1/2 | 112 | 115 |
| Acid Performance | Tensile Stress at Break after Acid Application under 1.5% Strain (number of cycles to maintain 75%) GM Test GMW18052 (August 2018) | ≥30 | ≥30 |
| | Tensile Stress at Break after Acid Application under 1.5% Strain (number of cycles to maintain 35%) GM Test GMW18052 (August 2018) | 12 | 15 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:

a polyoxymethylene polymer present in the polymer composition in an amount of at least 80% by weight, the polyoxymethylene polymer comprising a polyoxymethylene copolymer containing a comonomer, the comonomer being present in the polyoxymethylene copolymer in an amount of less than 2% by weight;

at least one acid neutralizing agent, the at least one acid neutralizing agent comprising a magnesium compound, and wherein a total amount of all acid neutralizing agents present in the polymer composition provides a weight percent of magnesium of greater than 2.4% by weight and less than 4.1% by weight;

a polyalkylene glycol, the polyalkylene glycol having a mean molecular weight of from 1,000 to 9,000 g/mol; and a primary antioxidant, the primary antioxidant comprising a hindered phenol, the primary antioxidant being present in the polymer composition in an amount of from 1% by weight to 2.5% by weight;

wherein the polymer composition is free of conductive metal fibers.

2. The polymer composition as defined in claim 1, wherein the comonomer comprises a dioxolane.

3. The polymer composition as defined in claim 1, wherein the polyoxymethylene copolymer contains the comonomer in an amount less than 1.8% by weight.

4. The polymer composition as defined in claim 1, wherein the polyoxymethylene polymer has a melt flow index of greater than 10 g/10 min when tested according to ISO Test 1133 at 190° C. and at a load of 2.16 kg.

5. The polymer composition as defined in claim 1, wherein the magnesium compound comprises magnesium oxide.

6. The polymer composition as defined in claim 5, wherein the magnesium oxide is present in the polymer composition to provide a weight percent of magnesium of greater than 0.6% by weight.

7. The polymer composition as defined in claim 5, wherein the magnesium oxide is present in the polymer composition to provide a weight percent of magnesium of greater than 0.8% by weight and less than 4.1% by weight and the polyalkylene glycol is present in the polymer composition in an amount of from 1% by weight to 5% by weight.

8. The polymer composition as defined in claim 5, wherein the magnesium oxide is present in the polymer composition to provide a weight percent of magnesium of greater than 2.4% by weight and less than 4.1% by weight.

9. The polymer composition as defined in claim 8, wherein the polyoxymethylene polymer has a content of terminal hydroxyl groups of 5 mmol/kg or more.

10. The polymer composition as defined in claim 1, wherein the polyalkylene glycol is present in the polymer composition in an amount of or from 1% by weight to 5% by weight.

11. The polymer composition as defined in claim 1, wherein the polymer composition further comprises calcium hydroxy stearate.

12. The polymer composition as defined in claim 1, wherein the polymer composition further comprises an ethylene bis(stearamide).

13. The polymer composition as defined in claim 1, wherein the polymer composition further comprises at least one secondary antioxidant, the secondary antioxidant comprising an aromatic amine, distearyl thiodipropionate, or mixtures thereof, each secondary antioxidant being present in the polymer composition in an amount of from 0.01% by weight to 1.8% by weight.

14. The polymer composition as defined in claim 1, wherein the polymer composition displays an acid resistance of greater than 30 cycles to maintain 75% tensile stress and greater than 10 cycles to maintain 35% tensile stress, displays a tensile modulus of greater than 2500 MPa, displays a tensile strength at yield of greater than 54 MPa, displays a Charpy notched impact strength at 23° C. of greater than 4 $KJ/m^2$, displays a Charpy notched impact strength at −30° C. of greater than 3 $KJ/m^2$, displays a density of from 1.4 $g/cm^3$ to 1.46 $g/cm^3$, displays a melting temperature of from 168° C. to 175° C., displays a DTUL of greater than 90° C., and displays a melt flow rate of from 9 g/10 min to 16 g/10 min.

15. The polymer composition as defined in claim 1, wherein the polyoxymethylene polymer has a content of terminal hydroxyl groups of 5 mmol/kg or more.

16. The polymer composition as defined in claim 1, wherein the polymer composition is free of nitrogen-containing formaldehyde scavengers.

17. The polymer composition as defined in claim 1, wherein the polymer composition further comprises at least one secondary antioxidant, the secondary antioxidant comprising an aromatic amine, the aromatic amine being present in the polymer composition in an amount of from 0.01% by weight to 0.8% by weight.

18. The polymer composition as defined in claim 1, wherein the polymer composition has a density from about 1.4 $g/cm^3$ to 1.46 $g/cm^3$.

19. A molded article made from the polymer composition as defined in claim 1, the molded article comprising an exterior vehicle part.

20. The molded article as defined in claim 19, wherein the exterior vehicle part comprises a fuel contacting member.

* * * * *